United States Patent Office 2,768,077

Patented Oct. 23, 1956

2,768,077

PHOTOLITHOGRAPHIC MATERIAL AND PROCESS

Wilhelm Neugebauer, Martha Tomanek, and Theo Scherer, Wiesbaden-Biebrich, Germany, assignors, by mesne assignments, to Azoplate Corporation, Summit, N. J., a corporation of New Jersey No Drawing. Application May 12, 1951, Serial No. 226,104

Claims priority, application Germany May 19, 1950

20 Claims. (Cl. 95—6)

The present invention relates to light-sensitive material for use in the lithographic art and to the method of using such material in that art. More particularly, it relates to light-sensitive material suitable for photomechanical reproduction and to methods of manufacturing lithographic printing plates from this material.

For a long time light-sensitive material for use in the field of photomechanical reproduction has been prepared by coating a base material with a colloidal layer containing a light-sensitive hardening agent such as a chromate salt. Exposure of such material to light under a master results in tanning or hardening of the light struck areas. The unhardened colloid is then removed and the hardened colloid image may serve as a carrier for greasy ink which is transferred to paper in the lithographic process. Recently, light-sensitive layers for this purpose have been prepared which do not contain any colloid in order to simplify the composition of the layer and in an endeavor to permit the manufacture of presensitized plates which can be stored until it is desired to use them. For example, light-sensitive diazo compounds have already been proposed for the preparation of this type of layer.

It is also known that dicinnamalacetone, anisal cinnamyl acetone and cinnamylidene acetophenone are light sensitive compounds. However, it has never been suggested that these materials are receptive to greasy ink nor that they could be used for the direct production of lithographic printing plates. These above mentioned compounds have been used in the preparation of photomechanical resists for etching purposes as described in U. S. Patent No. 1,965,710 to Alexander Murray. However, this patent teaches that it is necessary to use these compounds in combination with an inhibitor of crystallization such as certain resins and gums. The photosensitive layers prepared according to the teaching of the patent do not have good shelf life, i. e., they are not capable of storage.

Now it has been found that unsaturated ketones having the following carbon-atom grouping $$-(\overset{|}{C}=\overset{|}{C})_x-CO-(\overset{|}{C}=\overset{|}{C})_y-$$

in which $x$ and $y$ stand for a whole number selected from the group consisting of 0, 1, 2 and 3 and in which the sum of $x+y$ equals at least 2 (which formula includes the three compounds mentioned above), may be used with great advantage to make light-sensitive material without the addition of a crystallization inhibitor and that such material may be used for the production of lithographic printing plates.

Furthermore, it has been found that ketones of the grouping

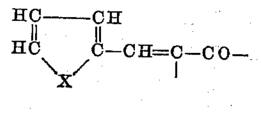

in which X stands for a member selected from the group consisting of O, S and NH, or ketones of the grouping

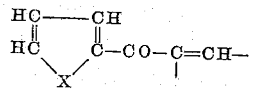

in which X stands for a member selected from the group consisting of O, S and NH, may also be used with great advantage in the same manner for the preparation of the light-sensitive layer on material to be employed for the production of lithographic printing plates.

According to the present invention, a light-sensitive layer may be prepared from one of these ketones without the addition of a tannable colloid substance or a crystallization inhibitor. This light-sensitive material may be exposed to light under a master and subsequently developed, for example, by means of dilute phosphoric acid to remove the compound not struck by light. The light-struck areas which are covered now with a photoproduct of the unsaturated ketone, accept greasy ink and the material may be used directly as a printing-plate for planographic printing.

Ketones of the above given constitution which contain aromatic or heterocyclic radicals in general are superior to ketones without aromatic or heterocyclic radicals. These aromatic or heterocyclic radicals may also be substituted. However, the presence of substituents containing groups that render the substances water-soluble, will ordinarily be disadvantageous and render the ketone quite unsuitable for use according to the present invention.

As has already been indicated, some of the ketones included within the carbon atom groupings have already been described in the literature. In any event, these ketones may be prepared by starting with ketones characterized by having one or two $CH_2$-groups directly linked with the CO-group, and condensing them on one side or on both sides with suitable aldehydes according to known methods of preparative chemistry. Suitable intermediate products which have already been described in the literature can also be used for the preparation of ketones falling within the scope of this invention.

The following ketones are indicated as examples of water insoluble unsaturated ketones which may be used for the preparation of lithographic material according to this invention:

α-Cinnamylidene-methyl-ethyl-ketone (M. P. 108–110° C.)

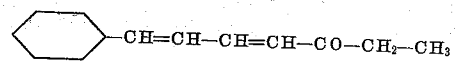

compare Scholtz, "Berichte der Deutschen Chemischen Gesellschaft," 29th volume (1896), page 614.

α-Cinnamylidene-α-acetyl-acetone (M. P. 102.5° C.)

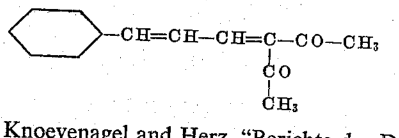

compare Knoevenagel and Herz, "Berichte der Deutschen Chemischen Gesellschaft," 37th volume (1904), page 4483.

α-Cinnamylidene-γ-furfurylidene-acetone (M. P. 97–98° C.)

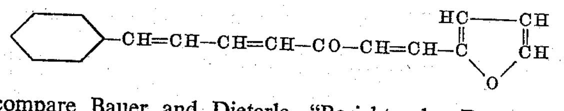

compare Bauer and Dieterle, "Berichte der Deutschen Chemischen Gesellschaft," 44th volume (1911), page 2701.

α-Cinnamylidene-γ-benzylidene-acetone (M. P. 106–108° C.)

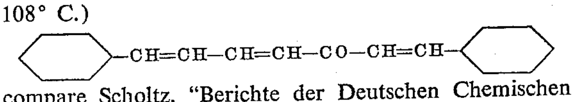

compare Scholtz, "Berichte der Deutschen Chemischen Gesellschaft," 29th volume (1896), page 614.

α-Cinnamylidene-γ-benzylidene-γ-methyl-acetone

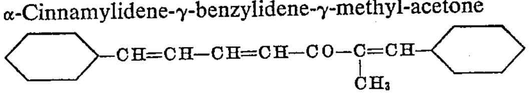

which is obtained by condensation of cinnamic aldehyde with γ-benzylidene-methyl-ethyl-ketone in an alcoholic-aqueous caustic soda solution. After recrystallization from alcohol it appears as a light-yellow, crystalline substance which melts at 85° C. the γ-benzylidene-methyl-ethyl-ketone can be prepared according to Harries, "Berichte der Deutschen Chemischen Gesellschaft," 35th volume (1902), page 970.

Cinnamylidene-acenaphthenone (M. P. 167–168° C.)

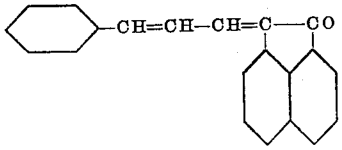

compare Beilstein, volume VII, Suppl. vol. II, page 503, De Fazi, Gazzetta Chimica Italiana 54, page 665.

Cinnamylidene-3-nitro-acetophenone (M. P. 135–136° C.)

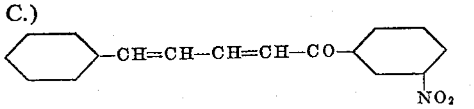

compare Beilstein, volume VII, suppl. vol. II, page 452, Giua, Gazzetta, Chimica Italiana 55, pages 568–569.

α,γ-Dicinnamylidene-acetone (M. P. 142° C.)

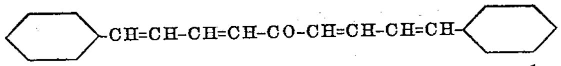

compare Diehl and Einhorn, "Berichte der Deutschen Chemischen Gesellschaft," 18th volume (1885), page 2324.

α-Benzylidene-γfurfurylidene-acetone (M. P. 55–56° C.)

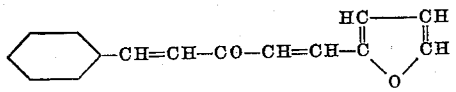

compare Claisen and Ponder, "Annalen der Chemie," volume 223 (1884), page 147.

α-Cinnamylidene-γ-anisylidene-acetone (M. P. 138–139° C.)

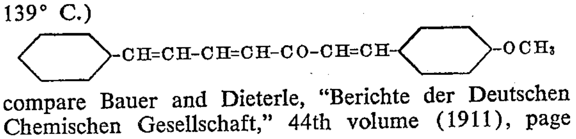

compare Bauer and Dieterle, "Berichte der Deutschen Chemischen Gesellschaft," 44th volume (1911), page 2693.

α-Benzylidene-γ-[phenyl-pentadienylidene]-acetone

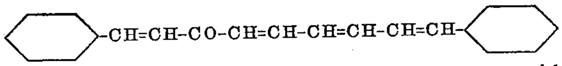

obtainable by condensation of benzylidene-acetone with 1-phenyl-pentadiene-(1,3)-al(5) in alcoholic solution in the presence of small quantities of alkali. The condensation product is a strongly yellow colored substance melting at 375° C or above.

α-Cinnamylidene-γ-[phenyl-pentadienylidene]-acetone

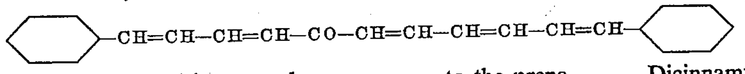

which is prepared in an analogous manner to the preparation of α-benzylidene-γ-[phenyl-pentadienylidene]-acetone from cinnamylidene-acetone and 1-phenyl-pentadiene-(1,3)-al(5). After recrystallization from alcohol it forms a dark yellow colored crystalline substance which melts at 132–133° C.

1-phenyl-7-[9-anthracene]-n-hepta-1,3,6-triene-one-(5)

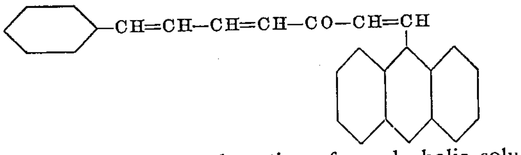

which is obtained by condensation of an alcoholic solution of cinnamylidene-acetone with 9-anthracenealdehyde in the presence of a small quantity of caustic soda. This new compound separates as a yellow precipitate. After recrystallization from alcohol it melts at 130–132° C.

1-phenyl-5-[9-anthracene]-n-penta-1,4-diene-one-3

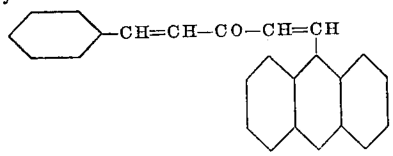

is prepared by condensation of benzylidene-acetone with 9-anthracene-aldehyde in an alcoholic solution in the presence of a few drops of a 10% solution of caustic soda. This ketone is a yellow substance melting at 228–230° C.

Cinnamylidene-6,7-di-(acetyl-hydroxy)-cumaranone (M. P. 176° C.)

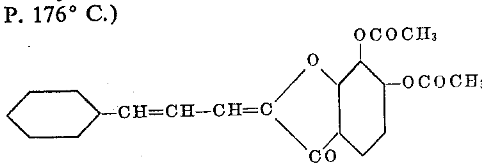

compare Haller and v. Kostanecki, "Berichte der Deutschen Chemischen Gesellschaft," 30th volume (1897), page 2951.

Cinnamylidene-5-acetyl-acenaphthene

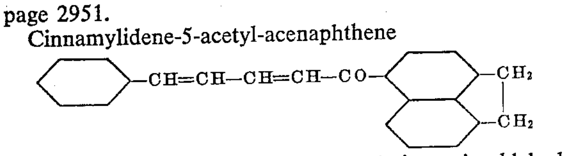

which is prepared by condensation of cinnamic aldehyde with 5-acetyl-acenaphthene in alcoholic solution in the presence of sodium ethylate in the form of yellow crystals, M. P. 95–97° C. Compare in this connection Fleischer and Wolf, "Berichte der Deutschen Chemischen Gesellschaft," 53rd volume (1920), page 926.

Dicinnamylidene-cyclopentanone (M. P. 225° C.)

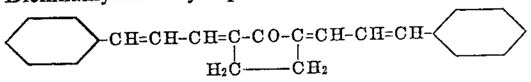

compare Vorländer and Hobohm, "Berichte der Deutschen Chemischen Gesellschaft," 29th volume (1896), page 1838.

Difurfurylidene-cyclopentanone (M. P. 162° C.)

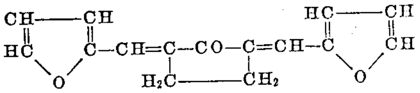

compare Vorländer and Hobohm, "Berichte der Deutschen Chemischen Gesellschaft," 29th volume (1896), page 1839.

Dicinnamylidene-p-diacetyl-benzene

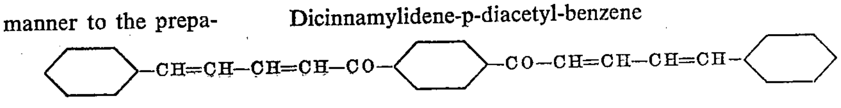

In analogy to the production of dibenzylidene-p-diacetylbenzene (Pfeiffer, "Annalen der Chemie," volume 460 (1928) page 145), one mole of p-diacetylbenzene is condensed with 2 moles of cinnamic aldehyde in the presence of a small quantity of caustic soda. Yellow needles are precipitated from alcohol, M. P. 198° C.

Furfurylidene-acetophenone (oil, B. P. 317° C.)

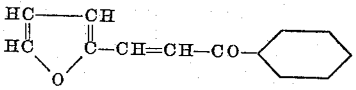

von Kostanecki and Podrajanski, "Berichte der Deutschen Chemischen Gesellschaft," 29th volume (1896), page 2248.

Furfurylidene-acenaphthenone

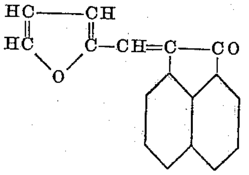

which is prepared like cinnamylidene-acenaphthenone by condensation of furfural (furfur aldehyde) with acenaphthenone. Yellow crystals, M. P. 138–140° C.

Difurfurylidene-p-diacetylbenzene

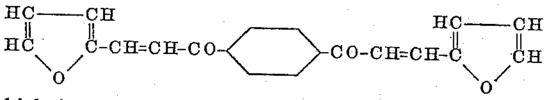

which is prepared like dibenzylidene-p-diacetyl-benzene (Pfeiffer, "Annalen der Chemie," volume 460 (1928), page 145) by condensation of 2 moles of furfural with 1 mole of p-diacetyl-benzene. Yellow crystals separate from alcohol, M. P. 234–235° C.

ω-Thenylidene-acetophenone (M. P. 59° C.)

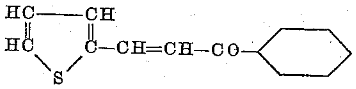

obtainable from α-thiophenealdehyde and acetophenone in the presence of sodium methylate in methanol. (See Grischkiewitsch-Trochimowski and Mazurewicz, "Journ. Russ. Phys.-Chem. Ges." 44, pages 570–581; "Chemisches Zentralblatt" 1912 II, page 1561).

α-Benzoyl-β-[α-pyrryl]-ethylene (M. P. 138–139° C.)

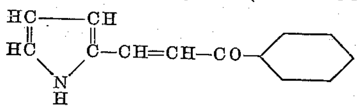

Lubrzynska, "Journal of the Chemical Society," London (1916), volume 109, page 1120.

α-Cinnamoyl-furan (M. P. 87–88° C.)

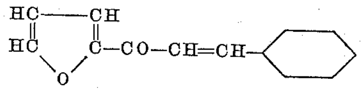

Weygand and Strobelt, "Berichte der Deutschen Chemischen Gesellschaft," 68th year (1935), page 1844.

α-Cinnamoyl-thiophene (M. P. 80° C.)

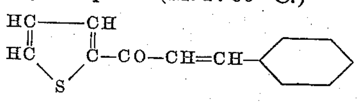

Brunswig, "Berichte der Deutschen Chemischen Gesellschaft," 19th year (1886), page 2895.

x-Cinnamoyl-thionaphthene (yellow oil) of the probable configuration

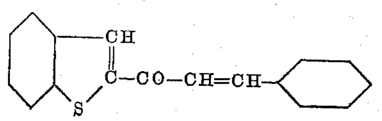

obtainable by condensation of an alcoholic solution of x-acetyl-thionaphthene with benzaldehyde in the presence of alkali.

The preparation of the light-sensitive material is carried out in accordance with this invention by applying (if possible in the dark) a solution of the ketone to a suitable support or base material for example, to a metallic base, particularly to plates or foils of zinc or aluminum which may be provided with a chemically or electrochemically produced oxide layer, or which are roughened in known manner, mechanically or with acid or chromate baths or the like.

For example, the base material can be whirl-coated with the solution. Subsequently, the coated material is dried. Organic solvents such as alcohols, e. g. methyl or ethyl alcohol, dioxane, pyridine, benzene, methyl-ethyl-ketone, glycol monomethyl ether, or mixtures of these solvents can be used for the preparation of the coating solution. Mixtures of several unsaturated ketones can also be employed in accordance with this invention. At times, this may be advantageous particularly if the individual ketones possess a pronounced tendency toward crystallization. Usually the use of two or more light-sensitive ketones results in a more even coating of the base material.

It has now been found that a considerable improvement in this type of light-sensitive material is achieved by adding to the light-sensitive layer an inhibitor of polymerization, for example, one of those selected from the group consisting of aromatic hydroxyl compounds, quinones, and dyestuffs of the thiazine class. Light-sensitive layers containing such inhibitors of polymerization can be stored for a longer period of time. As a rule it suffices to add very small quantities of the polymerization inhibitor. In most cases, about 0.1%, for instance, based on the amount of ketone or ketone mixture used, is quite sufficient although in some cases as much as 10% may be used. The practical procedure is to add the polymerization inhibitor to the solution containing the light-sensitive ketone or ketones.

The polymerization inhibitors which form an important feature of the present invention are distinct from the crystallization inhibitors described in U. S. Patent No. 1,965,710 which latter are essentially resins and gums. The crystallization inhibitors described in the patent do not prevent polymerization and improve the shelf life of the layer as do the polymerization inhibitors described above. As has already been pointed out, where necessary, crystallization can be prevented by using combinations of the unsaturated ketones themselves. The polymerization inhibitors tend to prevent or slow down polymerization of the unsaturated ketones during storage so that they remain light-sensitive and suitable for the manufacture of printing plates after comparatively long periods of time.

The dyestuffs of the thiazine class disclosed above as suitable polymerization inhibitors must also be distinguished from the triphenylmethane dyestuffs disclosed in U. S. Patent No. 2,169,003. These latter dyestuffs do not prevent polymerization or improve shelf life, they only serve to make the image visible so that the progress of the exposure may be observed.

The following compounds given by way of example are effective polymerization inhibitors; phenols, like hydroquinone, quinones as p-benzoquinone, p-toluquinone and chloranil (2,3,5,6-tetrachloro-p-benzoquinone), and among the dyes belonging to the thiazine series dyestuffs like thionine (Schultz, Farbstofftabellen, 7th edition, volume 1, 1931, page 448, No. 1036), thionine blue G (same reference, page 452, No. 1042), methylene blue B (same reference page 449, No. 1038), toluidine blue O (same reference page 451, No. 1041), and similar dyes.

To produce the printing plates the coated material is exposed to a light image usually by exposing to light under an original. The exposure to light can be carried out for example, by using carbon arc-lamps or mercury lamps. In all areas struck by light the unsaturated ketones which ordinarily have a yellow color bleach out; i. e., light-decomposition products are formed, which are absorptive for the shorter wave lengths of light. A positive image appears which is usually yellow colored when the light-sensitive material is exposed under a positive pattern.

The exposed surface is then treated with dilute acid, for example, phosphoric acid, and the surface is rubbed in with greasy ink in the presence of some water. The greasy ink remains only in those areas which are covered with light decomposition products since they are oleophilic and receptive to greasy ink, whereas the greasy ink is repulsed in the areas not struck by light. The production of the printing plate can also be carried out by rubbing in the exposed surface with greasy ink, followed by a treatment with a dilute acid. The exposed surface may of course also be treated with greasy ink and dilute acid simultaneously. In all cases, positive images and printing forms are obtained from negative patterns and negative images are obtained from positive originals.

Light-sensitive metal plates which have been prepared in accordance with this invention, are stable for a rather long period of time in contrast to the conventional plates produced by the chromate process.

The following examples are inserted to illustrate the present invention. It is not intended to restrict the scope of the invention to the subject matter described in the examples. The parts indicated in the examples are by weight, if not otherwise stated.

(1) A solution of 2.5 parts of α-cinnamylidene-γ furfurylidene-acetone in 100 parts of alcohol is applied to an anodically oxdized aluminum foil, for example, by means of a plate whirler, and subsequently dried. The coated surface of the foil is then exposed under a negative master to the light of an 18 ampere carbon arc lamp at a distance of 60 cm. for about 2 minutes. Subsequently the light-exposed foil is developed by swabbing with a 3% solution of phosphoric acid and rubbing in the surface of the foil with greasy ink. A positive image develops. The printing foil carrying the positive image may then be clamped to an offset-machine and prints may be made in the usual manner.

(2) The procedure is the same as described in Example 1 except that the foil is coated with a solution of a mixture of 1.5 parts of α-cinnamylidene-γ-benzylidene-acetone and 1.5 parts of α-cinnamylidene-γ-benzylidene-γ-methyl-acetone in 100 parts of alcohol. Positive images and printing plates are obtained. If the foil is coated with a solution containing only one of the ketones described above, the results obtained are not as good.

(3) A superficially oxidized aluminum foil is coated with a 2.5% solution of cinnamylidene-acenaphthenone dissolved in a mixture of equal quantities of dioxane and alcohol, dried and exposed to light under a negative master. The rest of the procedure is the same as described in Example 1. Positive printing plates are obtained.

Instead of the above mentioned compounds a 2.5% solution of cinnamylidene-3-nitro-acetophenone or furfurylidene-acenaphthenone or α,γ - dicinnamylidene - acetone or dicinnamylidene-cyclopentatone or difurfurylidene-cyclopentanone or dicinnamylidene-p-diacetyl-benzene or difurfurylidene-p-diacetyl-benzene may be used for the preparation of the light-sensitive layer instead of the solution described above and it will render the same good effect.

(4) 2.5 parts of cinnamylidene-5-acetyl-acenaphthene are dissolved in 100 parts of alcohol. Then an aluminum foil is coated with this solution and dried. Subsequently, the light sensitive material is exposed to light under a negative master, the exposed layer is developed by wiping over the surface with a 3% solution of sulfonic acid or a 3% solution of nitric acid and rubbed in with greasy ink. Positive printing plates are obtained from negative masters.

(5) For the coating of a superficially oxidized aluminum plate there may be used the solution of 2.5 parts of α-cinnamylidene-methyl-ethyl-ketone or α-cinnamylidene-γ-acetyl-acetone or furfurylidene-acetophenone or α-benzylidene-γ-furfurylidene-acetone or α - cinnamylidene-γ-anisylidene-acetone or α-benzylidene-γ-(phenylpentadienylidene)-acetone or 1-phenyl-7-[9-anthracene]-n-hepta-1,3,6-triene-one-5 or 1-phenyl-5-[9-anthracene]-n-penta-1,4-diene-one-3 in 100 parts of alcohol. The further procedure is the same as described in Example 1. Positive images are obtained from negative masters.

(6) An aluminum foil which has been mechanically roughened is coated with a 2% dioxane solution of cinnamylidene - 6,7-di-(acetyl-hydroxy) - cumaranone. The coated plate is dried and exposed under a negative master. Then the light-exposed layer is treated with 5% acetic acid for 1–2 minutes and subsequently rubbed in with greasy ink and again with acetic acid. Positive printing plates are obtained.

(7) 2.5 parts of α-cinnamylidene-γ-furfurylidene-acetone, and a very small quantity of hydroquinone, are dissolved in 100 parts of a mixture of equal quantities of dioxane and alcohol. An aluminum plate is coated with this solution and dried. Then the coated surface of the foil is exposed to light under a negative master for 5 minutes and developed by wiping with a 4% solution of phosphoric acid, and rubbing in with greasy ink. In this manner, positive printing plates are obtained. The addition of hydroquinone improves the shelf-life of the sensitized aluminum plate in the unexposed state.

(8) A superficially roughened aluminum foil is coated with a 1% solution of α-cinnamylidene-γ-citrylidene-acetone in alcohol. The rest of the procedure is as described in Example 1. Positive pictures and printing forms are obtained from negative masters.

α-cinnamylidene-γ-citrylidene-acetone of the formula

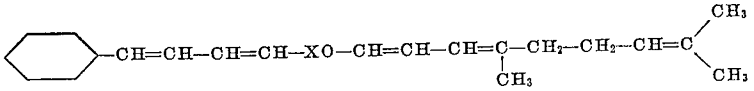

is made from citral and cinnamylidene-acetone with the aid of caustic soda. The condensation product is a dark brown oil.

(9) The same procedure is used as described in Example 1 except that the exposed foil is developed by bathing in 100 parts of a 9% solution of phosphoric acid to which 30 parts of alcohol have been added. After some seconds a clearly visible change of the yellow color to a colorless state takes place. Thereafter the developed foil is thoroughly rinsed with water and rubbed in with greasy printing ink. Positive images and printing plates are obtained from negative masters.

(10) The procedure is the same as described in Example 9 but a solution consisting of 100 parts of an 18% solution of phosphoric acid and 5 parts of alcohol is used for developing the exposed foil.

(11) The procedure is the same as described in Example 9 but a mixture consisting of 100 parts of an 18% solution of phosphoric acid and 5 parts of acetone is used for developing the exposed foil. Positive images are obtained from negative masters.

(12) The procedure is the same as described in Example 1, but the foil is coated with a solution of a mixture consisting of 1 part of furfurylidene-α-acetyl-thiophene and 1 part of furfurylidene-4-acetyl-diphenyl in 100 parts of alcohol. Positive images and printing plates are obtained.

Furfurylidene - α - acetyl - thiophene (melting point—126–127° C.) of the formula

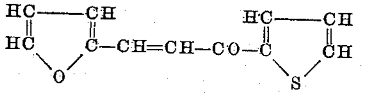

is described by Weygand and Strobelt in "Berichte der Deutschen Chemischen Gesellschaft," 68th volume (1935), page 1845.

Furfurylidene - 4 - acetyl - diphenyl (melting point—126–127° C.) of the formula

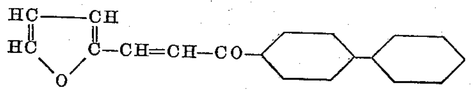

is prepared by condensation of 4-acetyl-diphenyl with furfural in the presence of aqueous, alcoholic caustic soda.

(13) A solution of 1 part of α-cinnamyl-thiophene in 100 parts of alcohol is applied to an aluminum foil, for example, by means of a plate whirler, and is then dried. The light-sensitive layer so obtained is exposed under a negative master (by applying an arc light of 18 amperes for about 2 minutes at a distance of 60 cm.), the exposed layer is developed by swabbing with a 2% solution of phosphoric acid, and the developed surface of the foil is rubbed in with greasy ink. A positive image is obtained which can be used for printing as soon as the printing plate has been inserted into the offset printing machine.

(14) 1.5 parts of X-cinnamoyl-thionaphthene are dissolved in 100 parts of alcohol; this solution is applied as a layer to an anodically oxidized aluminum plate, and the plate is then dried. The coated material is exposed under a negative master. The exposed layer is developed by swabbing with a 2% solution of sulfuric acid or with a 2% solution of nitric acid, and the developed surface is rubbed in with greasy ink, or the exposed surface is developed simultaneously with acid and ink. Positive printing plates are obtained from negative masters.

(15) The same procedure is followed as described in Example 13, except that a solution of 2½ parts of α-cinnamoyl-furan in 100 parts of alcohol is used. Positive images and printing plates are obtained in this case also.

Instead of the solution mentioned above, a 2½% alcoholic solution of α-cinnamoyl-pyrrole can be used to produce the light-sensitive layer.

(16) A solution of 2½ parts of α-benzoyl-β-[α-pyrryl]-ethylene or ω-thenylidene-acetophenone in 100 parts of alcohol is applied as a layer to a superficially roughened aluminum foil and the same procedure is followed as described in Example 1 except that the exposed layer is developed by rubbing in with greasy printing ink and swabbing with a 2% solution of phosphoric acid. Positive images are obtained from negative masters.

(17) A solution produced by dissolving 2.5 parts of α-cinnamylidene-γ-furfurylidene-acetone and 0.1 part of methylene blue B in 100 parts of alcohol is applied to a mechanically roughened aluminum plate and then dried. Coated in this way, the plate can be stored at a temperature of 40° C. with an 85% moisture content of the air for four days with no observable change in the layer, while changes in the layer occur after two days when no methylene blue B is added.

After storage in this manner, the plate is placed under a negative pattern and is exposed for about two minutes to an 18 ampere-arc lamp at a distance of 60 cm. Then the exposed layer is developed by bathing in 950 parts of an 18% solution of phosphoric acid mixed with 50 parts of methyl ethyl ketone. Within a short time a color change becomes discernible. Thereupon the developed plate is thoroughly rinsed with water and is rubbed in with greasy ink. A positive printing plate is obtained.

(18) The same procedure as described in Example 17 is followed except that the aluminum plate is coated with a solution obtained by dissolving a mixture of 1.5 parts of α-cinnamylidene-γ-furfurylidene-acetone, 1 part of α-cinnamylidene-γ-citrylidene-acetone, and 0.1 part of thionine, in 100 parts of alcohol. Coated in this way, the plate can be stored under conditions as described in Example 17 for fifteen days without any change occurring in the light-sensitive layer. Without the addition of thionine the plate could not be stored for more than about ten days.

(19) 2.5 parts of α-cinnamylidene-γ-furfurylidene-acetone to which traces of hydroquinone are added, are dissolved in 100 parts of a mixture of equal parts of dioxane and alcohol, then this solution is applied as a layer to an aluminum plate and is subsequently dried. The plate is now exposed to light behind a negative pattern, developed by swabbing with a 4% solution of phosphoric acid and rubbed in with greasy ink. In this way positive printing plates are obtained. The addition of hydroquinone serves to increase the storage stability of the light-sensitive aluminum plate prior to its exposure.

(20) The same procedure as described in Example 17 is followed but the mechanically roughened aluminum plate is coated with a solution obtained by dissolving a mixture of 1 part of cinnamylidene-2-acetyl-thiophene, 1 part of α-cinnamylidene-γ-citrylidene-acetone and 0.1 part of p-benzoquinone respectively in 100 parts of alcohol. The addition of p-toluquinone or p-benzoquinone improves the shaft life of the unexposed light-sensitive plates to such a degree that the plates when dry may be stored for a couple of months at room temperature without any loss of their utility, whereas plates prepared without the addition of toluquinone or benzoquinone are ruined very quickly during storage.

Cinnamylidene-2-acetyl-thiophene with the formula

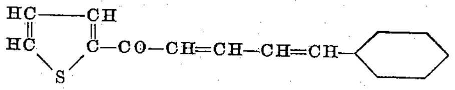

may be derived from 2-acetyl-thiophene and cinnamic aldehyde with the aid of a solution of caustic soda. The condensation product crystallizes out as a yellow substance melting at 100° C.

(21) 0.5 part of α-cinnamylidene-γ-anisylidene-acetone, 0.5 part of furfurylidene-acetophenone, 0.5 part of cinnamylidene-2-acetyl-thiophene and 0.2 part of chloranil (2,3,5,6-tetrachloro-p-benzoquinone) are dissolved in 100 parts of alcohol and an aluminum foil is coated with this solution and dried. Thereafter the coated foil is exposed to light under a negative master, developed by swabbing with a 4% solution of phosphoric acid and rubbed in with greasy printing ink. Positive printing plates are obtained.

If chloranil (tetrachloroquinone) is added to the coating solution the coated plate may be stored for many months at room temperature when unexposed and dry, but without this addition it becomes useless after a few days.

After having fully described and disclosed the present invention, what we claim is:

1. The process for the preparation of printing plates which comprises coating a base material with an unsaturated ketone selected from the group consisting of water insoluble ketones having the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum of $x$ and $y$ being at least 2, $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

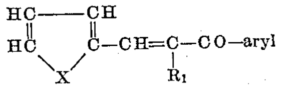

in which: X stands for a member selected from the group consisting of O, S, and NH, and $R_1$=a member of the group consisting of H, CO, aryl and alkyl;

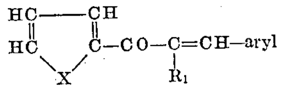

in which X stands for a member selected from the group consisting or O, S and NH, and $R_1$=a member of the group consisting of H, CO, aryl and alkyl, and

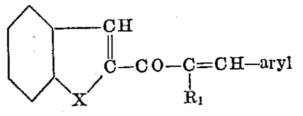

wherein X=a member of the class consisting of O, S, and NH, and $R_1$=a member of the class consisting of H, CO, aryl and alkyl, exposing the coated surface of the material to a light image, treating the surface with dilute acid to remove the unexposed portions thereof and rubbing in said surface with greasy ink.

2. The process for the preparation of printing plates which comprises coating a base material with an unsaturated ketone selected from the group consisting of water insoluble ketones having the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum of $x$ and $y$ being at least 2, $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

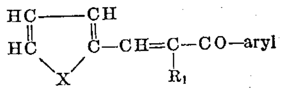

in which: X stands for a member selected from the group consisting of O, S and NH, and $R_1$=a member of the group consisting of H, CO, aryl and alkyl;

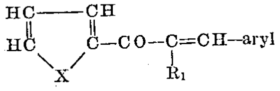

in which X stands for a member selected from the group consisting of O, S and NH, and $R_1$=a member of the group consisting of H, CO, aryl and alkyl, and

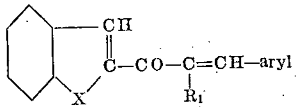

wherein X=a member of the class consisting of O, S, and NH, and $R_1$=a member of the class consisting of H, CO, aryl and alkyl, exposing the coated surface of the material to a light image, treating the surface with dilute acid to remove the unexposed portions thereof and finally rubbing in said surface with greasy ink in the presence of water.

3. The process for the preparation of printing plates which comprises coating a base material with an unsaturated ketone selected from the group consisting of water insoluble ketones having the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum of $x$ and $y$ being at least 2, $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

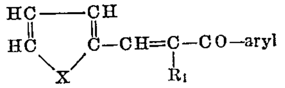

in which: X stands for a member selected from the group consisting of O, S and NH, and $R_1$=a member of the group consisting of H, CO, aryl and alkyl;

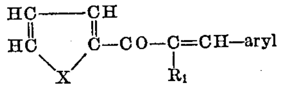

in which X stands for a member selected from the group consisting of O, S and NH, and $R_1$=a member of the group consisting of H, CO, aryl and alkyl, and

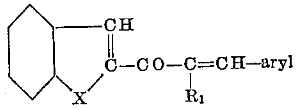

wherein X=a member of the class consisting of O, S, and NH, and $R_1$=a member of the class consisting of H, CO, aryl and alkyl, exposing the coated surface of the material to a light image rubbing in the exposed surface with greasy ink in the presence of water and subsequently treating said surface with dilute acid to remove the unexposed portions thereof.

4. The process for the preparation of printing plates which comprises coating a base material with an unsaturated ketone selected from the group consisting of water insoluble ketones having the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum of $x$ and $y$ being at least 2 $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

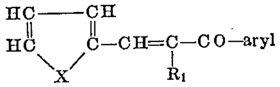

in which: X stands for a member selected from the group consisting of O, S and NH, and $R_1$=a member of the group consisting of H, CO, aryl and alkyl;

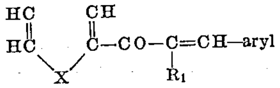

in which X stands for a number selected from the group consisting of O, S and NH, and $R_1$=a member of the group consisting of H, CO, aryl and alkyl, and

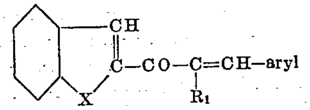

wherein X=a member of the class consisting of O, S, and NH, and $R_1$=a member of the class consisting of H, CO, aryl and alkyl, exposing the coated surface of the material to a light image and subsequently simultaneously treating the surface with dilute acid and greasy ink.

5. As a new article of manufacture light-sensitive material for making printing plates comprising a base material selected from the group consisting of aluminum and zinc and a layer coated on said base material comprising an unsaturated ketone selected from the group consisting of water insoluble ketones and mixtures thereof corresponding to one of the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum $x+y$ equaling at least 2, $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

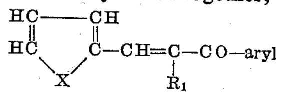

in which: X stands for a member selected from the group consisting of O, S and NH, and $R_1$=a member of the group consisting of H, CO, aryl and alkyl;

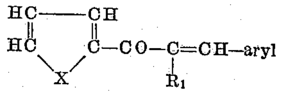

in which: X stands for a member selected from the group consisting of O, S and NH, and $R_1$=a member of the group consisting of H, CO, aryl and alkyl;

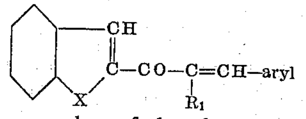

wherein: X=a member of the class consisting of O, S and NH, and $R_1$=a member of the class consisting of H, CO, aryl and alkyl, said layer being free of hardenable colloid substances and crystallization inhibiting substances other than unsaturated ketones coming within one of the above formulae.

6. As a new article of manufacture light-sensitive material for making printing plates comprising a base material selected from the group consisting of aluminum and zinc and a layer coated on said base material comprising an unsaturated ketone selected from the group consisting of water insoluble ketones and mixtures thereof corresponding to the following formula:

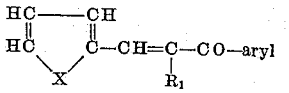

in which: X stands for a member selected from the group consisting of O, S and NH, and $R_1$=a member of the group consisting of H, CO, aryl and alkyl, said layer being free of hardenable colloid substances and crystallization inhibiting substances other than unsaturated ketones coming within the above formula.

7. As a new article of manufacture light-sensitive material for making printing plates comprising a base material selected from the group consisting of aluminum and zinc and a layer coated on said base material comprising an unsaturated ketone selected from the group consisting of water insoluble ketones and mixtures thereof corresponding to the following formula:

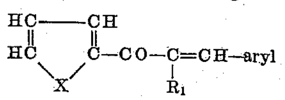

in which: X stands for a member selected from the group consisting of O, S and NH, and $R_1$=a member of the class consisting of H, CO, aryl and alkyl, said layer being free of hardenable colloid substances and crystallization inhibiting substances other than unsaturated ketones coming within the above formula.

8. As a new article of manufacture light-sensitive material for making printing plates comprising a base material selected from the group consisting of aluminum and zinc and a layer coated on said base material comprising an unsaturated ketone selected from the group consisting of water insoluble ketones and mixtures thereof corresponding to the following formula:

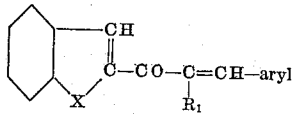

wherein: X=a member of the class consisting of O, S and NH, and $R_1$=a member of the class consisting of H, CO, aryl and alkyl, said layer being free of hardenable colloid substances and crystallization inhibiting substances other than unsaturated ketones coming within the above formula.

9. As a new article of manufacture light-sensitive material for use in the manufacture of printing plates comprising a base of flexible sheet metal material and a thin uniform layer coated on said base material comprising α-cinnamylidene-γ-furfurylidene-acetone of the formula

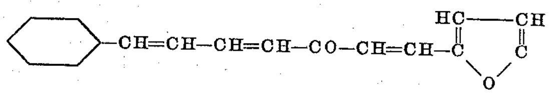

10. As a new article of manufacture light-sensitive material for use in the manufacture of printing plates comprising a base of flexible sheet metal material and a layer coated on said base material comprising α-cinnamylidene-γ-anisylidene-acetone of the formula

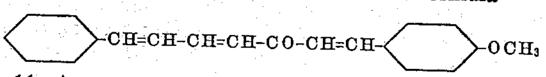

11. As a new article of manufacture light-sensitive material for use in the manufacture of printing plates comprising a base of flexible sheet metal material and a layer coated on said base material comprising α-cinnamylidene-γ-benzylidene-acetone of the formula

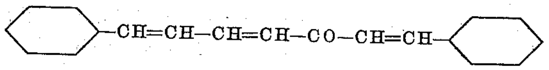

12. As a new article of manufacture light-sensitive material for use in the manufacture of printing plates comprising a base of flexible sheet metal material and a layer coated on said base material comprising cinnamylidene-2-acetyl-thiophene of the formula

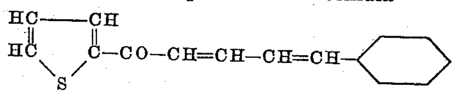

13. As a new article of manufacture light-sensitive material for use in the manufacture of printing plates comprising a base of flexible sheet metal material and a layer coated on said base material comprising cinnamylidene-5-acetyl-acenaphthene of the formula

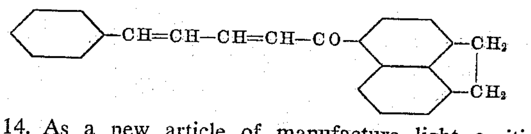

14. As a new article of manufacture light-sensitive material for making printing plates comprising a flexible sheet metal base material and a layer coated on said base material comprising an unsaturated ketone selected from the group consisting of water insoluble ketones and mixtures thereof corresponding to one of the following formulae:

$$R=(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum $x+y$ equaling at least 2, $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

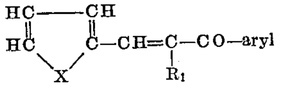

in which: X stands for a member selected from the group consisting of O, S and NH, and $R_1$=a member of the group consisting of H, CO, aryl and alkyl;

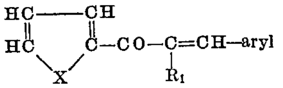

in which: X stands for a member selected from the group consisting of O, S and NH, and $R_1$=a member of the group consisting of H, CO, aryl and alkyl;

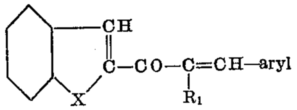

wherein: X=a member of the class consisting of O, S and NH, and $R_1$=a member of the class consisting of H, CO, aryl and alkyl, said layer being free of hardenable colloid substances and crystallization inhibiting substances other than unsaturated ketones coming within one of the above formulae, said layer also including a polymerization inhibiting compound selected from the group consisting of aromatic hydroxyl compounds, quinones and dyestuffs of the thiazine class.

15. As a new article of manufacture light-sensitive material for making printing plates comprising a base material and a layer coated on said base material comprising an unsaturated ketone selected from the group consisting of water insoluble ketones and mixtures thereof corresponding to one of the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum $x+y$ equaling at least 2, $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

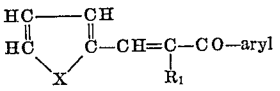

in which: X stands for a member selected from the group consisting of O, S and NH, and $R_1$=a member of the group consisting of H, CO, aryl and alkyl;

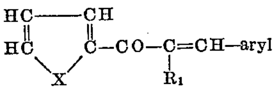

in which: X stands for a member selected from the group consisting of O, S and NH, and $R_1$=a member of the group consisting of H, CO, aryl and alkyl;

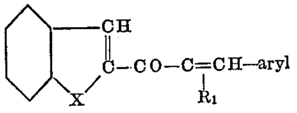

wherein: X=a member of the class consisting of O, S and NH, and $R_1$=a member of the class consisting of H, CO, aryl and alkyl, said layer being free of hardenable colloid substances and crystallization inhibiting substances other than unsaturated ketones coming within one of the above formulae, said layer also including $\rho$-toluquinone.

16. As a new article of manufacure light-sensitive material for making printing plates comprising a base material and a layer coated on said base material comprising an unsaturated ketone selected from the group consisting of water insoluble ketones and mixtures thereof corresponding to one of the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum $x+y$ equaling at least 2, $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

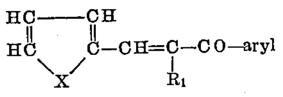

in which: X stands for a member selected from the group consisting of O, S and NH, and $R_1$=a member of the group consisting of H, CO, aryl and alkyl;

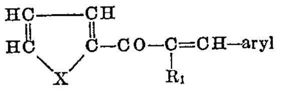

in which: X stands for a member selected from the group consisting of O, S and NH, and $R_1$=a member of the group consisting of H, CO, aryl and alkyl;

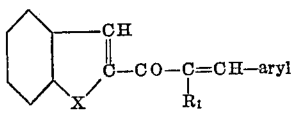

wherein: X=a member of the class consisting of O, S, and NH, and $R_1$=a member of the class consisting of H, CO, aryl and alkyl, said layer being free of hardenable colloid substances and crystallization inhibiting substances other than unsaturated ketones coming within one of the above formulae, said layer also including p-benzoquinone.

17. As a new article of manufacture light-sensitive material for making printing plates comprising a base material and a layer coated on said base material comprising an unsaturated ketone selected from the group consisting of water insoluble ketones and mixtures thereof corresponding to one of the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum $x+y$ equaling at least 2, $R_1$=a member of the group consisting of H, CO, aryl and alkyl, and R=a member of the group consisting of aryl, alkyl and heterocyclic radicals, and wherein a carbon atom of the ethylene linkage alpha to the ketone group and the carbon atom of the ketone group may be additionally linked together;

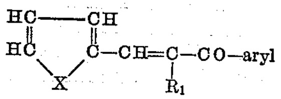

in which: X stands for a member selected from the group consisting of O, S and NH, and $R_1$=a member of the group consisting of H, CO, aryl and alkyl;

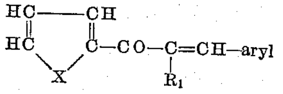

in which: X stands for a member selected from the group consisting of O, S and NH, and $R_1$=a member of the group consisting of H, CO, aryl and alkyl;

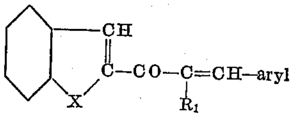

wherein: X=a member of the class consisting of O, S and NH, and $R_1$=a member of the class consisting of H, CO, aryl and alkyl, said layer being free of hardenable colloid substances and crystallization inhibiting substances other than unsaturated ketones coming within one of the above formulae, said layer also including 2,3,5,6-tetrachloro-p-benzoquinone.

18. As a new article of manufacture light-sensitive material for making printing plates comprising a base material and a layer coated on said base material comprising an unsaturated ketone selected from the group consisting of water insoluble ketones and mixtures thereof corresponding to one of the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum $x+y$ equaling at least 2, $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

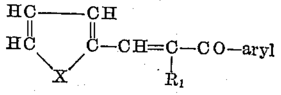

in which: X stands for a member selected from the group consisting of O, S and NH, and $R_1$=a member of the group consisting of H, CO, aryl and alkyl;

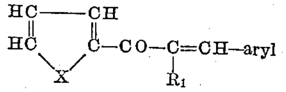

in which: X stands for a member selected from the group consisting of O, S and NH, and $R_1$=a member of the group consisting of H, CO, aryl and alkyl;

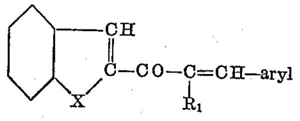

wherein: X=a member of the class consisting of O, S and NH, and $R_1$=a member of the class consisting of H, CO, aryl and alkyl, said layer being free of hardenable colloid substances and crystallization inhibiting substances other than unsaturated ketones coming within one of the above formulae, said layer also including methylene-blue-B.

19. As a new article of manufacture light-sensitive material for making printing plates comprising a base material and a layer coated on said base material comprising an unsaturated ketone selected from the group consisting of water insoluble ketones and mixtures thereof corresponding to one of the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum $x+y$ equaling at least 2, $R_1$=a member of the group consisting of H, CO, aryl and alkyl, R=a member of the group consisting of aryl, alkyl and heterocyclic radicals, and wherein a carbon atom of the ethylene linkage alpha to the ketone group and the carbon atom of the ketone group may be additionally linked together;

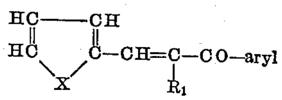

in which: X stands for a member selected from the group consisting of O, S and NH, and $R_1$=a member of the group consisting of H, CO, aryl and alkyl;

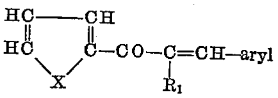

in which: X stands for a member selected from the group consisting of O, S and NH, and $R_1$=a member of the group consisting of H, CO, aryl and alkyl;

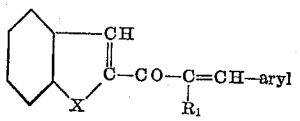

wherein: X=a member of the class consisting of O, S and NH, and $R_1$=a member of the class consisting of H, CO, aryl and alkyl, said layer being free of hardenable colloid substances and crystallization inhibiting substances other than unsaturated ketones coming within one of the above formulae, said layer also including thionine.

20. As a new article of manufacture light-sensitive material for making printing plates comprising a flexible sheet metal base having a hydrophilic surface, said surface having a thin uniform layer coated thereon comprising an unsaturated ketone selected from the group consisting of water insoluble ketones and mixtures thereof corresponding to one of the following formulae:

$$R-(\underset{R_1}{C}=\underset{R_1}{C})_x-CO-(\underset{R_1}{C}=\underset{R_1}{C})_y-R$$

in which: $x$ and $y$ stand for a number selected from the group consisting of 0, 1, 2 and 3, the sum $x+y$ equaling at least 2, $R_1$=a member selected from the group consisting of H, CO, aryl and alkyl, R=a member selected from the group consisting of aryl, alkyl and heterocyclic radicals, and wherein a carbon atom of the ethylene linkage alpha to the ketone group and the carbon atom of the ketone group may be additionally linked together;

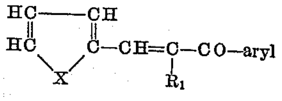

in which: X stands for a member selected from the group consisting of O, S and NH, and $R_1$=a member selected from the group consisting of H, CO, aryl and alkyl;

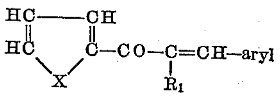

in which: X stands for a member selected from the group consisting of O, S and NH, and $R_1$=a member selected from the group consisting of H, CO, aryl and alkyl;

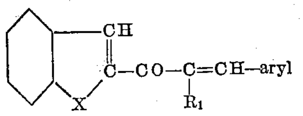

wherein: X=a member selected from the group consisting of O, S and NH, and $R_1$=a member selected from the group consisting of H, CO, aryl and alkyl, said layer being free of hardenable colloid substances and crystallization inhibiting substances other than unsaturated ketones coming within one of the above formulae.

References Cited in the file of this patent

UNITED STATES PATENTS

| | | |
|---|---|---|
| 1,965,710 | Murray | July 10, 1934 |
| 2,003,268 | Wescott | May 28, 1935 |
| 2,184,288 | Dangelmajer | Dec. 26, 1939 |
| 2,312,854 | Toland et al. | Mar. 2, 1943 |
| 2,367,420 | Mullen | Jan. 16, 1945 |
| 2,373,357 | Toland et al. | Apr. 10, 1945 |
| 2,532,865 | Toland et al. | Dec. 5, 1950 |
| 2,556,144 | Newman | June 5, 1951 |
| 2,570,262 | Newman | Oct. 9, 1951 |

FOREIGN PATENTS

| | | |
|---|---|---|
| 438,960 | Great Britain | Nov. 26, 1935 |

OTHER REFERENCES

Bauer et al.: "Berichte der Deutschen Chemischen Gesellschaft," vol. 44, page 2701 (1911).